F. FAIGLE.
INDICATING DEVICE FOR ASCERTAINING SPEED.
APPLICATION FILED OCT. 15, 1912.
1,196,450.
Patented Aug. 29, 1916.
3 SHEETS—SHEET 1.
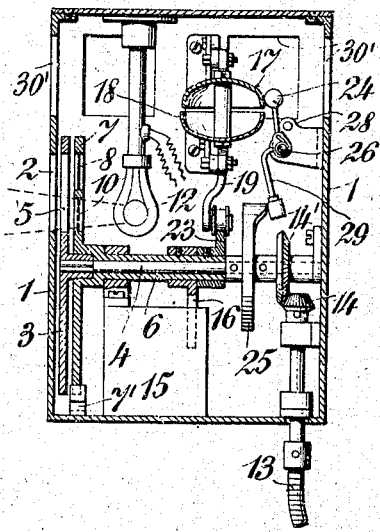
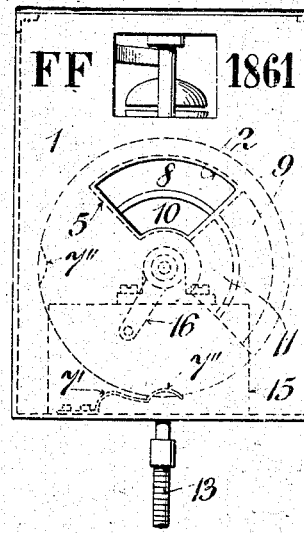
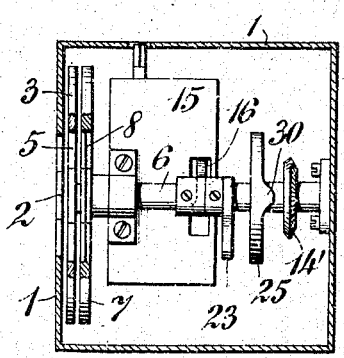
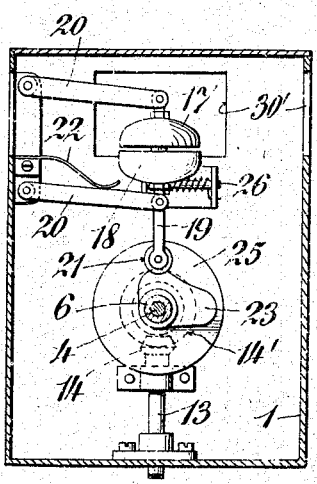
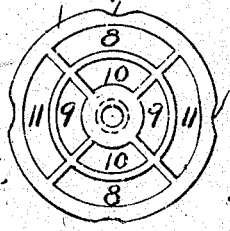
Witnesses:
C. Mommers
E. Leckert.
Inventor
Friedrich Faigle
By Henry Orth
Atty F. FAIGLE.
INDICATING DEVICE FOR ASCERTAINING SPEED.
APPLICATION FILED OCT. 15, 1912.
1,196,450.
Patented Aug. 29, 1916.
3 SHEETS—SHEET 2.
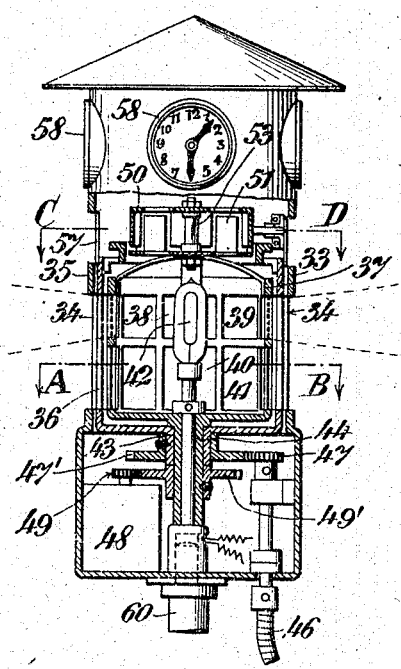
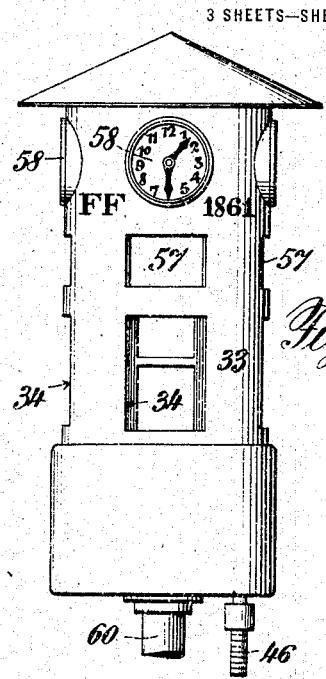
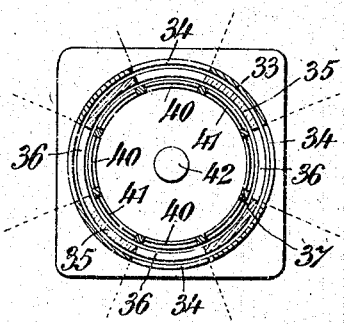
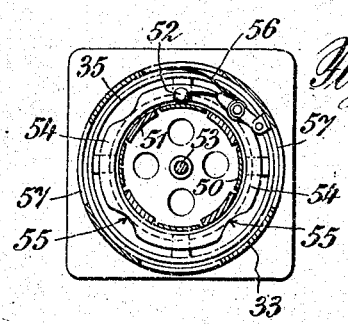
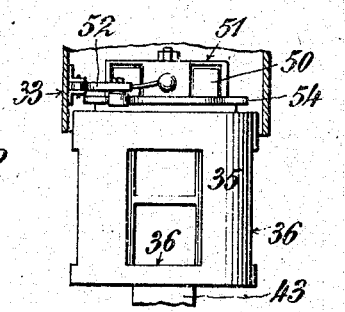
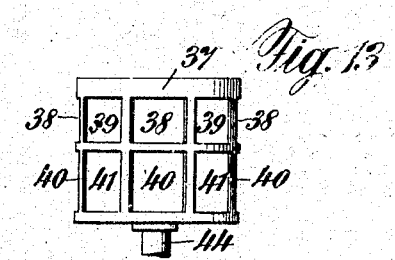
Witnesses:
Inventor:
Friedrich Faigle F. FAIGLE.
INDICATING DEVICE FOR ASCERTAINING SPEED.
APPLICATION FILED OCT. 15, 1912.
1,196,450.
Patented Aug. 29, 1916.
3 SHEETS—SHEET 3.
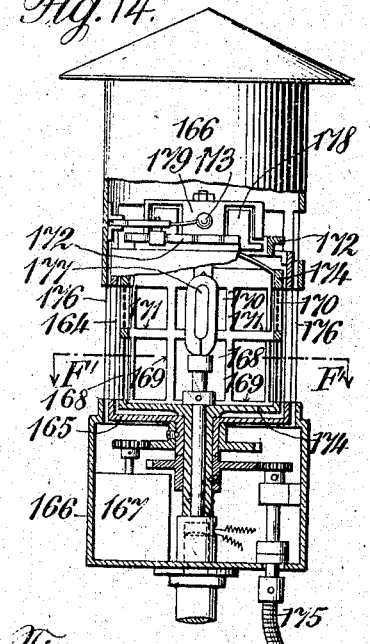
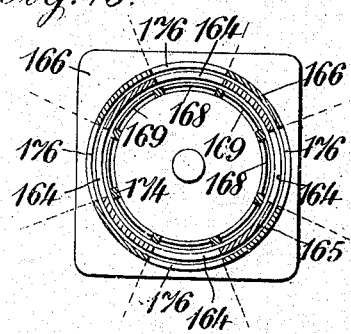
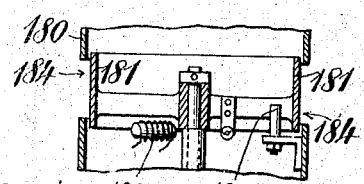
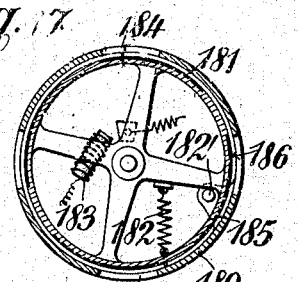
Witnesses:
Inventor: Friedrich Faigle

UNITED STATES PATENT OFFICE.

FRIEDRICH FAIGLE, OF HARD, NEAR BREGENZ, AUSTRIA-HUNGARY.

INDICATING DEVICE FOR ASCERTAINING SPEED.

1,196,450.  Specification of Letters Patent. Patented Aug. 29, 1916.

Application filed October 15, 1912. Serial No. 725,836.

*To all whom it may concern:*

Be it known that I, FRIEDRICH FAIGLE, a subject of the Emperor of Germany, residing at Hard, near Bregenz, Austria-Hungary, have invented new and useful Improvements in Indicating Devices for Ascertaining Speed; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

There are existing apparatus for indicating optically and acoustically the speed of vehicles and stationary machines, in which the speed is directly indicated by the adjustment of an element by means of centrifugally operating devices, said speed indication being given when a pre-determined speed has been exceeded; or such apparatus give only groups of speeds, or the resultant or average speeds, within comparatively large limits. In none of these existing devices is it possible to ascertain exactly the speed existing for the time being. Also the majority of these indicating devices indicate from one side only.

The object of this invention is to provide an improved signaling device by the aid of which the foregoing objections are avoided.

According to this invention I provide means for producing successive indications or signals proportional to the speed of the machine, the relation of which to the time required for producing them permits the exact speed at any time to be computed or ascertained. The mechanism is such that like successive intervals of time serve as observation periods for the indications, so that from the number of indications in a period of indication the speed may be calculated or determined. The device is constructed so that units of distances of travel or like numbers of rotation are distinguished, by causing one signal to extend over or continue for an interval equal to the unit to be measured. The duration of the signal can be determined by the combination with the signaling mechanism of a clock work, or simply by observing a watch. The signals may be either optical or acoustical or both, as will hereinafter be fully explained.

In the accompanying drawings several constructions according to this invention are illustrated by way of example.

Figure 1 is a vertical section showing a first form of construction, of which Fig. 2 is a side elevation. Fig. 3 is a horizontal section and Fig. 4 a further vertical section through the same. Fig. 5 is a detail view. Figs. 6 and 7 show a varied form of some details. Fig. 8 is a vertical section, illustrating a second form of construction, Fig 9 is a side elevation of the same. Figs. 10 and 11 are sections on lines A—B and C—D respectively of Fig. 8. Figs. 12 and 13 show parts of the construction. Figs. 14 and 15 show another form of construction. Figs. 16 and 17 show a varied form of parts of the construction. Fig. 18 shows a modification of Fig. 1.

All illustrated forms of construction of the device are supposed to be used on an automobile.

In the form of construction of the device illustrated by Figs. 1 to 7, 1 designates a casing of rectangular cross-section, in the front wall of which there is provided a segment shaped opening 2. On the inside of the front wall of the casing 1 a circular rotatable disk 3 is mounted on a shaft 4 horizontally supported in the casing. The disk has an opening 5 which corresponds with the opening 2 of the casing 1. The shaft 4 is surrounded on a part of its length by a hollow shaft 6, which carries a circular disk 7 arranged behind the disk 3. The disk 7 has two openings arranged side by side. The size and shape of each of these openings equals that of the openings 2 and 5 and the openings are divided in an inner and an outer field. In the outer fields of both openings there are inserted plates which do not allow the passage of light. The sides of the plates which are directed toward the disk 3 are painted with colors forming a striking contrast with each other. For instance the plate 8 inserted in the outer field of one opening may be painted white and the plate 9 inserted in the outer field of the other opening may be painted red. In the inner fields of both openings there are inserted disks of different colors which allow light to pass.

One of these plates is formed by a usual pane 10 and the other by a red pane 11 (Fig. 6). The colored plates 8 and 9 are for indication by day and the colored panes 10 and 11 for indication at night, and for the latter purpose there is provided a source of light behind the disk 7 on the level of the opening 2 of the casing 1, which may be formed for example by an incandescent lamp 12. The shaft 4 and the disk 3 are rotated at a speed which is proportional to the speed of the vehicle or the stationary machine to be observed. In the construction shown, the shaft may be suitably impelled for instance from one of the front wheels of the car by means of a flexible shaft 13 and bevel gears 14, 14'. The shaft 6 and disk 7 are intermittingly rocked from a clock work 15 arranged within the casing 1 by means of an arm 16 on the shaft 6, which arm is moved by the clock work in a suitable manner. This intermittent rocking movement is dimensioned so, that at the end of each motion to and fro alternately the one and the other opening of the disk 7, that means one time the fields 8 and 10 and the other time the fields 9 and 11 are behind the opening 2 of the casing, 1. In each of these positions the disk 7 is detained by a leaf spring 7' which then engages notches 7" in the periphery of the disk (Figs. 1 and 2). Besides the described means for producing optical signals for indication by day and at night the device is provided with means for producing acoustic signals. These latter means consist of two bells 17 and 18 of different sounds which are fastened on a rod 19. The rod 19 is carried by arms 20 pivotally attached to the casing 1, and is provided on its lower end with a roller 21 (Fig. 4). A leaf spring 22 acting on one of the arms tends always to press the roller 21 of rod 19 against the periphery of a cam 23 on the shaft 6 (Figs. 1 and 4). This cam which together with the disk 7 is intermittently rocked serves to raise and lower the rod 19 and the bells 17 and 18 at the end of each movement to and fro whereby the bells alternately come within the range of a clapper 24. This clapper is moved proportional to the speed of the automobile and derives its motion from a cam disk 25 on the shaft 4. The clapper is mounted free to turn about an axle 26 and is pressed by a torsion spring 27 against a stop 28 (Fig. 5). In this position the clapper is out of contact with the bells and an arm 29 of the clapper provided with a roller projects in the course of a projection 30 of the cam disk 25. At each revolution of the shaft 4 this projection by acting on the arm 29 moves the clapper toward the bells so that the clapper touches that bell which is within its range whereafter it is instantaneously moved back by the spring 27 in its position of rest against the stop 28. 30' designate openings in the casing 1 which allow the bell signals to be heard clearly outside the casing.

The device operates as follows: When the automobile is running the disk 3 is always rotated at a speed proportional to the speed of the car. By this rotation the opening 5 of the disk 3 coincides with the opening 2 of the casing 1 and the white or red field 8 or 9 of the disk 7 which is at any time behind the opening 2 becomes clearly visible as a suddenly appearing and suddenly disappearing optical signal, which forms a striking contrast with the one-colored, for example black or dark-gray front wall of the casing 1. At night these colored fields 8 and 9 are not visible. Then the incandescent lamp 12 is cut in, which is fed by a source of current for example by an electric battery on the automobile. In the moment in which the openings 2 and 5 coincide, an optical signal in form of a ray of light is sent by the lamp 12 through the openings. According to the red or white pane 10 or 11 of the disk 7 being in front of the opening 2 of the casing 1, the signal will be seen as a red or white ray of light. The acoustic signals are produced at the same time as the optical signals by the clapper 24 striking at each revolution of the shaft 4 against the bell within its range.

In order to ascertain the speed of the car, equal successive periods of observations are distinguished from each other by optical and acoustic means. This is performed by imparting each fifth second to the shaft 6 a sudden motion in the one or the other direction by means of the clockwork, so that for five sections the fields 8 and 10 and thereafter for five seconds the fields 9 and 11 are behind the opening 2 of the casing 1, and in the same manner the bell 17 having a high sound and thereafter the bell 18 having a deep sound are alternately moved every five seconds within the range of the clapper 24. In this manner there are produced each fifth second subsequent red or white signals by day and red or white rays of light at night, which signals are singly perceived by the observer and may be counted. Moreover there are alternately produced every five seconds subsequent high and deep bell signals, which will be heard by the driver, the passengers and persons without the car, and may be counted by them.

According as the automobile drives fast or slow the number of revolutions of the disk 3 and the number of strokes of the clapper 24 and therewith the number of the produced optical and acoustic signals of the same kind within one period of observation, that means during five seconds, is great or small. It is possible therefore to ascertain the speed of the car from the number of optical and acoustic signals of the same kind produced within one period of observation and from the coefficient representing the mechanical ratio of gearing between the shaft 4 and the part of the automobile, for example a front wheel, which impels this shaft.

In the described form of construction the shaft 6 and disk 7 may be intermittingly moved in the same direction instead of being intermittingly moved to and fro, for example, by the means shown in Fig. 8 for the movement of cylinder 37. In this case the disk 7 and the cam 23 are replaced by a disk 31 and a cam 32 (Figs. 6, 7 and 18). The disk 31 is provided with diametrically opposed fields 8, 10 and 9, 11 and the cam 32 carries two diametrically opposed projections and the disk 31 has four notches 7'' on its periphery for the leaf spring 7'.

The form of construction according to Figs. 8 to 13 produces simultaneously optical and acoustic signals toward different directions. For this purpose the device is provided with a vertical cylindrical casing 33 which is provided with four openings 34 which are displaced 90°. (Figs. 8 to 10). In the casing 33 there is rotatably arranged a hollow cylinder 35, which is provided with four openings 36, the size and arrangement of which corresponds with those of the openings 34 (Figs. 10 and 12). A second hollow cylinder 37 is rotatably arranged within the hollow cylinder 35, which is provided with eight openings shaped as the openings 34 and 36, each opening being divided in two fields arranged one above the other. In the upper fields of the openings there are inserted panes 38, 39 alternately of different colors, allowing light to pass, for example red and green ones, and in the lower fields there are inserted plates 40, 41 which do not allow the passage of light and are painted on the outer sides directed toward the hollow cylinder 35 with colors forming a striking contrast with each other, for example alternately white and red. The panes 38, 39 and the plates 40, 41 are arranged so with regard to each other, that there is always a white plate 40 below a red pane 38 and a red plate 41 below a green pane 39. Also in this form of construction the colored plates are for producing optical signals visible by daylight and the colored panes are for producing optical signals visible at night. For this latter purpose a source of light, for example an incandescent lamp 42 is arranged within the hollow cylinder 37 on the level of the panes 38, 39 which lamp is fed by a source of current arranged without the casing 33 for example by an electric battery on the automobile or the machine. The cylinders 35 and 37 are open on the top and closed on the bottom. At the lower ends they are connected to hollow shafts 43, 44 arranged one within the other, by means of which they may be rotated about a fixed vertical axle 45. The cylinder 35 is continually rotated from any rotating part of the vehicle or the machine on which the device is mounted, at a speed which is proportional to the speed of the vehicle or the machine. If for example the device is mounted on an automobile the cylinder is rotated from a front wheel of the automobile, suitably by means of a flexible shaft 46 and toothed wheels 47, 47'. The cylinder 37 is intermittingly rotated by means of toothed wheels 49, 49' from a clock work 48 arranged within the square lower part of the casing. The intermitting motion of rotation of the cylinder 37 is rated so that at the end of each motion of rotation the fields 38, 40 or 39, 41 are behind the openings 36 of the cylinder 35. Also in this form of construction the acoustic signals are produced by two bells 50, 51 of different sounds and by a clapper 52 (Figs. 8, 11 and 12). The bells are connected to one another by a screw 53, by which they are also secured to the cylinder 37. If desired the bells may be yieldingly connected to the cylinder. Each bell is provided on its periphery with four borders, by which they project one in the other without touching (Figs. 11 and 12), so that the borders of both bells 50 and 51 alternate. The clapper 52 is moved four times by the cylinder 35 during one revolution of the latter corresponding to the number of openings 36 in the cylinder. For this purpose a ring 54 is concentrically secured to the cylinder 35. The ring is provided with four notches 55 on its periphery which notches are displaced 90° (Fig. 11). The clapper 52 pivotally connected to the casing 33 is pressed by a roller under the action of a spring 56 against the periphery of the ring 54 (Fig. 11). If the roller on the clapper engages one of the notches 55, the clapper strikes on the border of the bell which is within its range. Four sound openings 57 are provided in the casing 33 on the level of the bells 50, 51 and above the openings 57 there are inserted in the casing 33 four clocks having transparent dial plates. Between the openings 57 and the clocks the regulation number of the vehicle is arranged on four sides in form of openings in the casing. 60 designates a standard supporting the casing 33. In consequence of the lighting by the incandescent lamp 42 the positions of the hands of the clocks 58 and the regulation number may be read at night. But for this purpose there may be provided a special source of light.

The device operates as follows: When the automobile is driven the cylinder 35 is rotated at a speed proportional to the speed of the automobile and when by the rotation, the openings 36 of the cylinder 35 coincide with openings 34 in the stationary casing, the colored fields 40 and 41 behind the openings become clearly visible through the openings 34 and 36 in day-time as suddenly appearing and suddenly disappearing optical signals, because also in this case the colored fields form a striking contrast with the outside of the casing which for example may be painted with a dark neutral color. If at night the colored fields 40 and 41 are not visible, the incandescent lamp 42 is cut in, and red or green flashes of light will then become visible through the red or green panes 38 or 39 and through the coinciding openings 34 and 36. Simultaneously with the optical signals the clapper 52 strikes against the bell within its range.

In order to ascertain the speed of the automobile, equal successive periods of observation are distinguished from each other by optical and acoustic means in the same manner as in the form of construction shown in Figs. 1 to 7. A sudden motion of rotation is imparted each fifth second to the cylinder 37 from the clock work 48 so that during five seconds the fields 38, 40 and thereafter during five seconds the fields 39, 41 are behind the openings 34 of the casing 33, and in the same manner the bell 50 having a high sound and thereafter the bell 51 having a deep sound are struck in successive five second periods by the clapper 52. In this manner there are produced alternating colored signals of five seconds duration red or white by day and red or green flashes of light at night and simultaneously high or deep bell signals. These optical and acoustic signals will be singly perceived by the observer or the driver and may be counted. By the number of optical and acoustic signals of the same kind produced within one period of observation the speed of the automobile may be ascertained in the above described manner.

The last described form of construction possesses the advantage as compared with the form of construction shown in Figs. 1 to 7, that the optical signals are simultaneously sent in four directions, so that they are visible and may be counted from four different sides. The cylinder 35 could also be provided with a single opening 36, in which case the optical signals are not sent simultaneously but one after another in the four directions, whereat the cylinder 35 would have to rotate at a speed four times as large as before.

The devices may be used besides for automobiles also for locomotives, tramcars, ships, airships, flying machines as well as for stationary machines, the speed of which is to be controlled and to be ascertained at large or small distances. The devices are suitably to be mounted at such places that the optical and acoustic signals may be clearly perceived by the driver or other persons within or without the car, and that particularly the optical signals may be distinctly and without hindrance perceived at relatively large distances by persons without the vehicle as by controllers.

The intermitting motion of the parts impelled by the clock work is performed so that the motion proper does not require much time and that there are always stops (periods of observation) between the motions. These intermitting motions are suitably produced by Maltese gears. The parts impelled by the vehicle or the stationary machine are constructed so that they can be moved as well by progressive motion or motion in one direction as by retrograde motion or motion in the opposite direction.

Besides the mentioned marks of distinction acting during the whole period of observation, as different colors of the optical signals and different sounds of the acoustic signals, also the moments in which the periods of observation alternate may be marked by short optical or short acoustic signals.

The described forms of construction act also if the clock work should fail, because the observer is able to ascertain by means of any chronometer for example a watch, the number of optical or acoustic signals produced within one period of observation. The division of time of the device may also be controlled by a watch.

Fig. 14 is a vertical section and Fig. 15 a section on line F—F of Fig. 14. The outer cylinder 165 provided with four openings 164 is intermittingly rotated for example by means of toothed wheels from a clock-work 167 arranged in the lower portion of the casing 166. The inner cylinder 174 is continually or intermittingly rotated also by means of toothed wheels and a flexible shaft 175 from one of the front wheels of the car at a speed proportional to the speed of the automobile. This cylinder has in its lower part eight fields 168 and 169 alternately of different colors, for example red and white, which also do not allow light to pass, and in its upper part eight panes 170 and 171 of different colors, for example red and blue. In the casing 166 there are also provided four openings 176 which like the openings 164 in the cylinder 165 extend in the casing throughout the height of both rows of colored panes and disks of the inner cylinder. A source of light, for example an incandescent lamp 177 is fixedly arranged in the cylinder 174 on the level of the panes 170 and 171. Bells 178, 179 of different sounds are secured to the rotatable inner cylinder 174. A cam ring 172 mounted on the outer cylinder 165 actuates the clapper 173. When the automobile is driving the cylinder 174 is continually or intermittingly rotated proportional to the traveling speed. When by this rotation the openings 164 in the outer cylinder coincide with the openings 176 of the stationary casing, the red and white fields 168 and 169 become alternately visible by day through the coinciding openings, and red and blue light signals are alternately sent outward at night through the panes 170 and 171. Simultaneously the bell 178 with a clear sound and the bell 179 with a deep sound are alternately struck by the clapper 173 actuated by the clock-work 167. The ratio of gearing the inner cylinder 174 may be chosen so, that for example each ten meters passed by the car the color of the optical signals is altered and one of the bells is struck.

The illustrated or described forms of construction may of course be used not only for automobiles, but also for other vehicles as locomotives, ships, flying machines, and the like, as well as stationary machines, as steam engines, turbines, and the like. In the latter case the optical and acoustic signals are always changed after a distinct, constant number of revolutions of the machine. With vehicles equal units of way and with stationary machines equal numbers or units of revolutions are distinguished from each other by optical and acoustic signals so that the speed of the vehicle or of the stationary machine can be ascertained by the duration of a signal representing a unit of way or of revolutions.

In the form of construction according to Figs. 14 and 15 the changing of the sound of the bells and the moving of the clapper may be performed by the clock-work instead of the vehicle or the stationary machine. In this case the clapper is moved always at small intervals, for example every second and the sound is changed at relatively large intervals for example every ten seconds, while the optical devices are moved by the vehicle or the stationary machine and indicate units of way or of revolutions, so that the times are perceived by the ear and simultaneously the distances or numbers of revolutions by the sight. By the ratio of the time and the corresponding distance or number of revolutions the speed of the vehicle or the stationary machine can be ascertained. In an analogous manner large or small periods may be optically distinguished from another by means actuated by the clockwork, and large or small units of way or of revolutions may be distinguished from another by acoustic means operated by the vehicle or the stationary machine. In this latter case the speed can be ascertained by simultaneously perceiving the time by the sight and the corresponding distances or numbers of revolutions by the ear.

The signaling device according to this invention can be constructed otherwise than described. For example a casing may be provided which is furnished with at least one source of light and at least one opening or two diametrically located openings of different colors for indication at night or with two opposite outer walls painted with different colors for indication by day. This casing is rotated by the vehicle or the stationary machine proportional to their speed.

The ratio of time and way, which expresses "speed" is represented according to this invention either by the number of units of way or of revolutions per unit of time, or by the number of units of time per unit of way or of revolutions.

The described forms of construction may be varied widely without departing from the spirit of my invention.

I claim:

1. In a speed indicator, means to produce a succession of signals dependent upon and variable with the speed of the vehicle, and means to produce during said signals successive signals independent of the first signals and at regular intervals under all conditions of operation.

2. In a speed indicator, means for producing a series of optical signals in accordance with the speed being indicated, and means to simultaneously produce audible signals at regular intervals under all conditions of operation.

3. In a speed indicator, a casing, means therein to produce a series of optical signals at intervals proportionate to the speed to be indicated, means in said casing to produce signals at regular intervals, and a clockwork operating as the actuating means for the production of said signals at regular intervals.

4. In a speed indicator, a casing having an opening therein, a shutter arranged to pass said opening, and mechanism to move said shutter in proportion with the speed being indicated, a clock-work in said casing and signal producing means operated by said clock-work to produce signals at regular intervals.

5. In a speed indicator in combination, a stationary casing having an opening therein, a movable member having an opening corresponding to that in the casing, said member being within the casing and coöperating therewith, a second movable member coöperating with said first movable member and casing and having two transparent color fields, a lamp adjacent the second movable member, said openings and fields arranged to come into register, means to move one of the movable members proportionate to the speed of the machine to be indicated, and a clock-work to move the other movable member.

6. In a speed indicator in combination, a casing having an opening therein, a movable element in said casing having an opening therein corresponding to the opening in the casing, a second movable element in the casing having a pair of differently colored transparent fields, a lamp beyond said second element arranged to send light through said transparent fields and openings when in register, means to move one of said elements proportionally to the speed of the machine to be indicated, and a clock work to move the other element.

7. In a speed indicator in combination, a stationary casing having an opening therein, a rotatable element therein also having an opening, a clock mechanism to drive said element, a second rotatable element in said casing and within the first element, having at least two pairs of fields, the fields of each pair consisting of a transparent field and an adjacent non-transparent field, each pair of fields arranged to register with said openings, and means to drive said second element proportionately to the speed to be indicated.

8. In a speed indicator in combination, a stationary cylindrical casing having a series of peripheral openings therein, a rotatable cylindrical member therein having peripheral openings therein corresponding to those in the casing, a clock-work to drive said member, a second cylindrical member within the first member and having a non-transparent field and a superposed transparent field corresponding to each opening in the casing, said second member driven from the machine whose speed is to be indicated, and a light within the casing and second member to illumine the transparent fields at night.

9. In a speed indicator, the combination with a casing having a sight opening therein, two rotatable members within the casing, one of said members having an opening arranged to periodically register with said sight opening and the other member provided with one or more colored fields arranged to periodically register with said sight opening, means to rotate one of the members at a uniform speed, and means to rotate the other member proportionately to the speed of the machine to be indicated, both members always rotated in the same direction when indicating.

In testimony that I claim the foregoing as my invention, I have signed my name in presence of two subscribing witnesses.

FRIEDRICH FAIGLE.

Witnesses:
   TH. ALTHERS,
   RANDALL ATKINSON.